US009964646B2

(12) United States Patent
Murphy

(10) Patent No.: US 9,964,646 B2
(45) Date of Patent: May 8, 2018

(54) AIRCRAFT TRACKING METHOD AND DEVICE AND METHOD OF INSTALLATION

(71) Applicant: The Boeing Company, Chicago, IL (US)

(72) Inventor: Timothy Allen Murphy, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 194 days.

(21) Appl. No.: 14/832,879

(22) Filed: Aug. 21, 2015

(65) Prior Publication Data

US 2017/0052258 A1 Feb. 23, 2017

(51) Int. Cl.
*G01S 19/14* (2010.01)
*G01S 19/17* (2010.01)
(Continued)

(52) U.S. Cl.
CPC ............ *G01S 19/14* (2013.01); *G01S 5/0027* (2013.01); *G01S 19/17* (2013.01); *G01S 19/24* (2013.01);
(Continued)

(58) Field of Classification Search
CPC .... G01S 5/0009; G01S 5/0018; G01S 5/0027; G01S 19/01; G01S 19/13; G01S 19/14;
(Continued)

(56) References Cited

U.S. PATENT DOCUMENTS 4,674,704 A * 6/1987 Altoz ................. H05K 7/20136 244/1 R
5,379,224 A * 1/1995 Brown .................. G01S 5/0009 340/989
(Continued)

FOREIGN PATENT DOCUMENTS

EP 0559074 A1 9/1993
EP 1918733 A1 5/2008
(Continued)

OTHER PUBLICATIONS

Office Action, dated Aug. 11, 2016, regarding U.S. Appl. No. 14/858,235, 21 pages.
(Continued)

*Primary Examiner* — Bernarr E Gregory
(74) *Attorney, Agent, or Firm* — Yee & Associates, P.C.

(57) ABSTRACT

A method and apparatus for tracking the position of an aircraft. A tracking device comprises a satellite navigation system receiver, a satellite communications transceiver, and a processor hermetically sealed within a housing attached on an outside of the aircraft. The satellite navigation system receiver is used to identify the position of the aircraft using navigation signals received from a satellite navigation system. The processor generates position information identifying the position of the aircraft as identified using the navigation system receiver. The processor sends the position information to a receiving station via a communications satellite in a low Earth orbit using the satellite communications transceiver. The position information is automatically
(Continued)

generated by the processor and sent to the receiving station at a desired rate.

20 Claims, 8 Drawing Sheets

(51) Int. Cl.

| | |
|---|---|
| ***G01S 19/35*** | (2010.01) |
| ***G01S 19/42*** | (2010.01) |
| ***G01S 5/00*** | (2006.01) |
| ***G08G 5/00*** | (2006.01) |
| ***G01S 19/24*** | (2010.01) |
| ***G01S 19/34*** | (2010.01) |

(52) U.S. Cl.
CPC .............. *G01S 19/34* (2013.01); *G01S 19/35* (2013.01); *G01S 19/42* (2013.01); *G08G 5/0013* (2013.01); *G08G 5/0021* (2013.01); *G08G 5/0056* (2013.01); *G08G 5/0082* (2013.01)

(58) Field of Classification Search
CPC .......... G01S 19/17; G01S 19/24; G01S 19/34; G01S 19/35; G01S 19/38; G01S 19/39; G01S 19/42; G08G 5/0004; G08G 5/0013; G08G 5/0017; G08G 5/0021; G08G 5/0047; G08G 5/0056; G08G 5/0073; G08G 5/0082; H04W 84/02; H05K 7/20; H05K 7/20009; H05K 7/20136
See application file for complete search history.

(56) References Cited

U.S. PATENT DOCUMENTS

| | | | | |
|---|---|---|---|---|
| 5,927,648 | A | 7/1999 | Woodland | |
| 5,974,158 | A | 10/1999 | Auty et al. | |
| 6,799,094 | B1 | 9/2004 | Vaida et al. | |
| 7,196,621 | B2 | 3/2007 | Kochis | |
| 7,218,227 | B2 | 5/2007 | Davis et al. | |
| 7,375,679 | B1 | 5/2008 | Mookerjee et al. | |
| 7,898,425 | B2 | 3/2011 | Nagy et al. | |
| 8,614,633 | B1 | 12/2013 | Lear et al. | |
| 9,031,497 | B1 | 5/2015 | Hoffman et al. | |
| 9,049,585 | B1 | 6/2015 | Hoffman et al. | |
| 2003/0032426 | A1* | 2/2003 | Gilbert ................. | H04W 84/02 455/427 |
| 2003/0193409 | A1* | 10/2003 | Crank ................. | G08G 5/0013 340/970 |
| 2005/0007257 | A1 | 1/2005 | Rast | |
| 2006/0187026 | A1 | 8/2006 | Kochis | |
| 2007/0159378 | A1 | 7/2007 | Powers et al. | |
| 2008/0191863 | A1 | 8/2008 | Boling et al. | |
| 2008/0258885 | A1 | 10/2008 | Akhan | |
| 2009/0173822 | A1 | 7/2009 | Kravitz et al. | |
| 2009/0284552 | A1 | 11/2009 | Larson et al. | |
| 2010/0026523 | A1 | 2/2010 | McCullough et al. | |
| 2010/0109912 | A1 | 5/2010 | Stokes et al. | |
| 2010/0253567 | A1 | 10/2010 | Factor et al. | |
| 2012/0166016 | A1* | 6/2012 | Bartley ................. | G01S 5/0027 701/1 |
| 2012/0191273 | A1 | 7/2012 | Jacobs et al. | |
| 2012/0200460 | A1 | 8/2012 | Weed et al. | |
| 2012/0274643 | A1 | 11/2012 | Tanaka | |
| 2013/0023205 | A1 | 1/2013 | Trautenberg | |
| 2013/0112804 | A1 | 5/2013 | Zhu | |
| 2013/0229298 | A1 | 9/2013 | Eckstein et al. | |
| 2014/0225769 | A1 | 8/2014 | Akcasu et al. | |
| 2015/0007080 | A1 | 1/2015 | Nama et al. | |
| 2015/0203218 | A1 | 7/2015 | Martegani | |
| 2016/0217381 | A1 | 8/2016 | Bloomquist et al. | |
| 2017/0043881 | A1 | 2/2017 | Fleck et al. | |
| 2017/0082455 | A1 | 3/2017 | Adler et al. | |

FOREIGN PATENT DOCUMENTS

| | | | |
|---|---|---|---|
| EP | 2348496 | A1 | 7/2011 |
| EP | 2882010 | A1 | 6/2015 |
| WO | 9602905 | A1 | 2/1996 |
| WO | WO03104834 | A2 | 12/2003 |
| WO | N02012011825 | A1 | 1/2012 |

OTHER PUBLICATIONS

Extended European Search Report, dated Nov. 22, 2016, regarding Application No. EP16184621, 7 pages.
Final Office Action, dated Dec. 29, 2016, regarding U.S. Appl. No. 14/858,235, 17 pages.
Extended European Search Report, dated Feb. 7, 2017, regarding Application No. EP16188916.7, 10 pages.
Office Action, dated May 2, 2017, regarding U.S. Appl. No. 14/858,235, 21 pages.
Office Action, dated Aug. 15, 2017, regarding U.S. Appl. No. 14/858,235, 33 pages.
Extended European Search Report, dated Sep. 27, 2017, regarding Application No. EP16184621.7, 6 pages.

* cited by examiner 300
301
HOUSING
309
330
FASTENERS
308
ELECTRONICS
ATTACHMENT STRUCTURES
324
ELECTROMAGNETIC INTERFERENCE SHIELDING GASKET
323
THROUGH HOLE
326
BASE PLATE
320
FASTENERS
322
314
MOUNTING HOLES
316
THROUGH HOLE
318
337
AIRCRAFT SYSTEMS
338
OUTSIDE
306
SKIN
302
INSIDE
304
EMERGENCY LOCATOR TRANSMITTER
310
ANTENNA
311
ELECTRONICS
312

500
518
516
520
530
534
528
532
526
510
514
508
504
502
506
512
536

AIRCRAFT TRACKING METHOD AND DEVICE AND METHOD OF INSTALLATION

BACKGROUND INFORMATION

1. Field

The present disclosure relates generally to tracking the position of an aircraft. More particularly, the present disclosure relates to a method and device for tracking the position of an aircraft and a method for attaching a tracking device to an aircraft.

2. Background

Many aircraft carry distress radio beacons. Distress radio beacons also may be known as emergency beacons or by other names. For example, without limitation, many commercial passenger aircraft and other aircraft may carry a distress radio beacon known as an emergency locator transmitter, ELT.

An emergency locator transmitter on an aircraft is intended to aid in locating the aircraft after a crash. An emergency locator transmitter or other distress radio beacon on an aircraft may be manually or automatically activated to send out a distress signal. For example, without limitation, an emergency locator transmitter may be activated automatically upon immersion in water.

The distress signals generated by an emergency locator transmitter or other distress radio beacon on an aircraft may be monitored and detected by a network of satellites worldwide. The geographic position of an emergency locator transmitter or other radio distress beacon emitting a distress signal may be determined using a satellite navigation system, triangulation, or using another method or an appropriate combination of methods.

Current emergency locator transmitters may have several limitations. For example, position information provided by current emergency locator transmitters may not be sufficiently accurate or provided in a sufficiently reliable manner to effectively locate an aircraft in distress effectively. The majority of currently fielded emergency locator transmitters do not provide position information directly. The location of the emergency locator transmitter is determined by radio frequency direction finding or multilateration through satellite links. This process may take an undesirably long time and may not be sufficiently reliable.

The weight of current emergency locator transmitters may be relatively high. Maintenance requirements for current emergency locator transmitters also may be relatively high. For example, most emergency locator transmitters fitted to aircraft today are powered by a non-rechargeable battery that is relatively heavy and must be maintained appropriately to ensure reliable operation and to prevent any undesired condition from occurring. It also may be relatively difficult to reduce or eliminate undesirable tampering with current emergency locator transmitters.

Accordingly, it would be beneficial to have a method and apparatus that take into account one or more of the issues discussed above, as well as other possible issues.

SUMMARY

The illustrative embodiments of the present disclosure provide an apparatus comprising a satellite navigation system receiver, a satellite communications transceiver, a number of antennas for the satellite navigation system receiver and the satellite communications transceiver, a processor, and a housing. The satellite navigation system receiver is configured to identify a position of an aircraft using navigation signals received from a satellite navigation system. The processor is configured to generate position information identifying the position of the aircraft as identified by the satellite navigation system receiver and to send the position information to a receiving station via a communications satellite in a low Earth orbit using the satellite communications transceiver. The processor is configured to generate and send the position information automatically at a rate. The housing is attached to the aircraft on an outside of the aircraft. The satellite navigation system receiver, the satellite communications transceiver, the number of antennas, and the processor are hermetically sealed within the housing.

The illustrative embodiments are also drawn to a method of tracking a position of an aircraft. A position of the aircraft is identified using a satellite navigation system receiver and navigation signals received from a satellite navigation system. Position information identifying the position of the aircraft as identified using the satellite navigation system receiver is generated by a processor. The processor sends the position information to a receiving station via a communications satellite in a low Earth orbit using a satellite communications transceiver. The processor generates and sends the position information automatically at a rate. The satellite navigation system receiver, the processor, and the satellite communications transceiver are hermetically sealed within a housing attached to the aircraft on an outside of the aircraft.

The illustrative embodiments of the present disclosure also provide a method of attaching a tracking device to an aircraft. An antenna for an emergency locator transmitter is removed from a location on a skin of the aircraft where the antenna for the emergency locator transmitter is attached to the skin of the aircraft. The tracking device is attached to the skin of the aircraft at the location on the skin of the aircraft where the antenna for the emergency locator transmitter was attached to the skin of the aircraft. The tracking device comprises a satellite navigation system receiver configured to identify a position of the aircraft using navigation signals received from a satellite navigation system, a satellite communications transceiver, a number of antennas for the satellite navigation system receiver and the satellite communications transceiver. The tracking device also comprises a processor configured to generate position information identifying the position of the aircraft as identified by the satellite navigation system receiver and send the position information to a receiving station via a communications satellite in a low Earth orbit using the satellite communications transceiver. Further, the tracking device comprises a housing containing the satellite navigation system receiver, the satellite communications transceiver, the number of antennas, and the processor. The satellite navigation system receiver, the satellite communications transceiver, the number of antennas, and the processor are hermetically sealed within the housing.

Various features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and benefits thereof, will best be understood by reference to the following detailed description of illustrative embodiments of the present disclosure when read in conjunction with the accompanying drawings, wherein:

DETAILED DESCRIPTION

Figure 1:
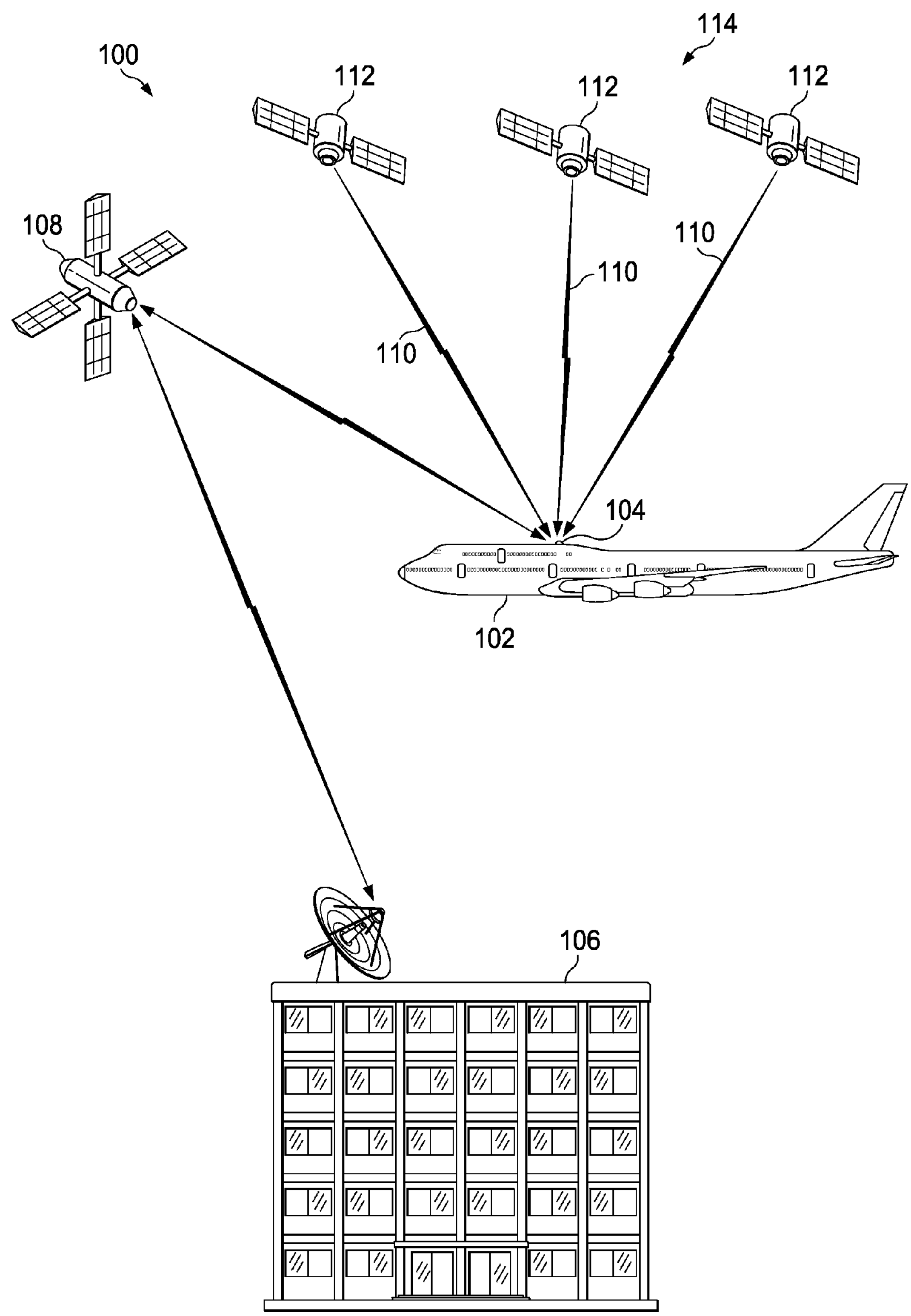
FIG. 1 is an illustration of an aircraft operating environment in accordance with an illustrative embodiment.

The different illustrative embodiments recognize and take into account a number of different considerations. "A number," as used herein with reference to items, means one or more items. For example, "a number of different considerations" are one or more different considerations.

The different illustrative embodiments recognize and take into account that there may be great interest in the ability to track aircraft globally in a manner that improves upon the use of emergency locator transmitters. For example, it may be desirable that global tracking of aircraft is provided with better accuracy, greater reliability, and at lower cost than may be provided using current emergency locator transmitters.

It also may be desirable that a device for tracking the position of an aircraft is both robust and autonomous. For example, it may be desirable that a device for tracking the position of an aircraft is implemented in a tamper-proof manner. For example, without limitation, it may be desirable that a device for tracking the position of an aircraft is implemented such that proper operation of the tracking device cannot be affected in an undesired manner by a person onboard the aircraft.

The illustrative embodiments provide a technical solution to the problem of tracking an aircraft globally. The illustrative embodiments provide an improved tracking device for an aircraft that uses a satellite navigation system for determining the position of the aircraft and communicates position information identifying the position of the aircraft to an appropriate receiving station via a satellite.

For example, without limitation, a tracking device in accordance with an illustrative embodiment may include a receiver for receiving navigation signals from global positioning system satellites or another appropriate satellite navigation system. The tracking device may include an appropriate transceiver for sending position information to the receiving station via Iridium communications satellites or other communications satellites in low Earth orbit. The electronics for determining the position of the aircraft and for sending the position information to the receiving station may be contained within a housing that is configured to be attached to a skin of the aircraft on the outside of the aircraft.

A tracking device in accordance with an illustrative embodiment may be implemented in a tamper-proof manner, so that proper operation of the tracking device may not be affected in an undesired manner from onboard the aircraft. For example, without limitation, backup or primary power for operation of a tracking device in accordance with an illustrative embodiment may be provided by a battery or other source of power that is contained within the housing attached to the outside of the aircraft. In this case, power for operation of the tracking device may not be intentionally or accidentally interrupted from inside of the aircraft.

Providing backup battery power in the housing for the tracking device also makes reliable operation of a tracking device in accordance with an illustrative embodiment more robust. For example, without limitation, providing backup battery power for a tracking device in accordance with an illustrative embodiment may allow the tracking device to continue to operate properly when other power for the aircraft to which the tracking device is attached is lost.

Interfaces for controlling operation of a tracking device in accordance with an illustrative embodiment from inside of an aircraft to which the tracking device is attached may be limited or eliminated to reduce or prevent undesired tampering with operation of the tracking device from onboard the aircraft. Preferably, all or substantially all control of a tracking device in accordance with an illustrative embodiment is provided either automatically by the electronics for the tracking device itself or by commands sent via a satellite to the tracking device from a location remote from the aircraft to which the tracking device is attached.

Turning to FIG. 1, an illustration of an aircraft operating environment is depicted in accordance with an illustrative embodiment. Aircraft operating environment 100 may include any appropriate environment in which aircraft 102 may be operated in any appropriate manner. For example, without limitation, aircraft 102 may be in flight in aircraft operating environment 100.

Aircraft 102 may be any appropriate type of aircraft that may be configured to perform any appropriate operation or mission in aircraft operating environment 100. For example, without limitation, aircraft 102 may be a commercial passenger aircraft, a cargo aircraft, a military aircraft, or any other appropriate type of aircraft. Further, aircraft 102 may be a fixed wing aircraft, a rotary wing aircraft, or a lighter-than-air aircraft. Still further, aircraft 102 may be a manned aircraft or an unmanned aircraft.

In accordance with an illustrative embodiment, aircraft 102 may include tracking device 104. For example, without limitation, tracking device 104 may be attached to the skin of aircraft 102 on the outside of aircraft 102. In accordance with an illustrative embodiment, tracking device 104 may be configured to automatically determine the position of aircraft 102 when aircraft 102 is in flight in aircraft operating environment 100 and to automatically send position information identifying the position of aircraft 102 to receiving station 106 via satellite 108.

Tracking device 104 may be configured to identify the position of aircraft 102 using navigation signals 110 received from a number of navigation system satellites 112 in satellite navigation system 114 in a known manner.

Tracking device 104 may use navigation signals 110 received from more than three navigation system satellites 112 in satellite navigation system 114 to determine the position of aircraft 102. For example, without limitation, navigation system satellites 112 may include satellites in satellite navigation system 114 such as the Global Positioning System, GPS, the Global Navigation Satellite System, GLONASS, other appropriate satellite navigation systems, or various combinations of satellite navigation systems that may be used by tracking device 104 to determine the position of aircraft 102.

Satellite 108 may comprise any appropriate satellite or plurality of satellites for establishing a communications link between tracking device 104 and receiving station 106 for sending position information identifying the position of aircraft 102 from tracking device 104 to receiving station 106. For example, without limitation, satellite 108 may be a communications satellite in low Earth orbit. A satellite in low Earth orbit is in orbit around the Earth with an altitude between approximately 160 kilometers and 2000 kilometers. For example, without limitation, satellite 108 may be a satellite in the Iridium satellite constellation operated by Iridium Communications. A satellite in the Iridium satellite constellation is referred to herein as an Iridium satellite or an Iridium communications satellite.

Information other than position information may be sent from tracking device 104 on aircraft 102 to receiving station 106 via satellite 108. For example, without limitation, tracking device 104 may be configured to send an alert to receiving station 106 via satellite 108 when aircraft 102 is determined to be in distress. Additionally, instructions for controlling operation of tracking device 104 may be sent from receiving station 106 to tracking device 104 on aircraft 102 via satellite 108. For example, without limitation, instructions for controlling when or how often position information is sent from tracking device 104 may be sent from receiving station 106 to tracking device 104 via satellite 108.

For example, without limitation, receiving station 106 may be located on the ground. Receiving station 106 may be part of or otherwise associated with any appropriate facility or entity that may be associated with the operation of aircraft 102. For example, without limitation, receiving station 106 may be operated by or for an airline that operates aircraft 102. For example, without limitation, receiving station 106 may be part of or associated with a global aircraft tracking system.

Figure 2:
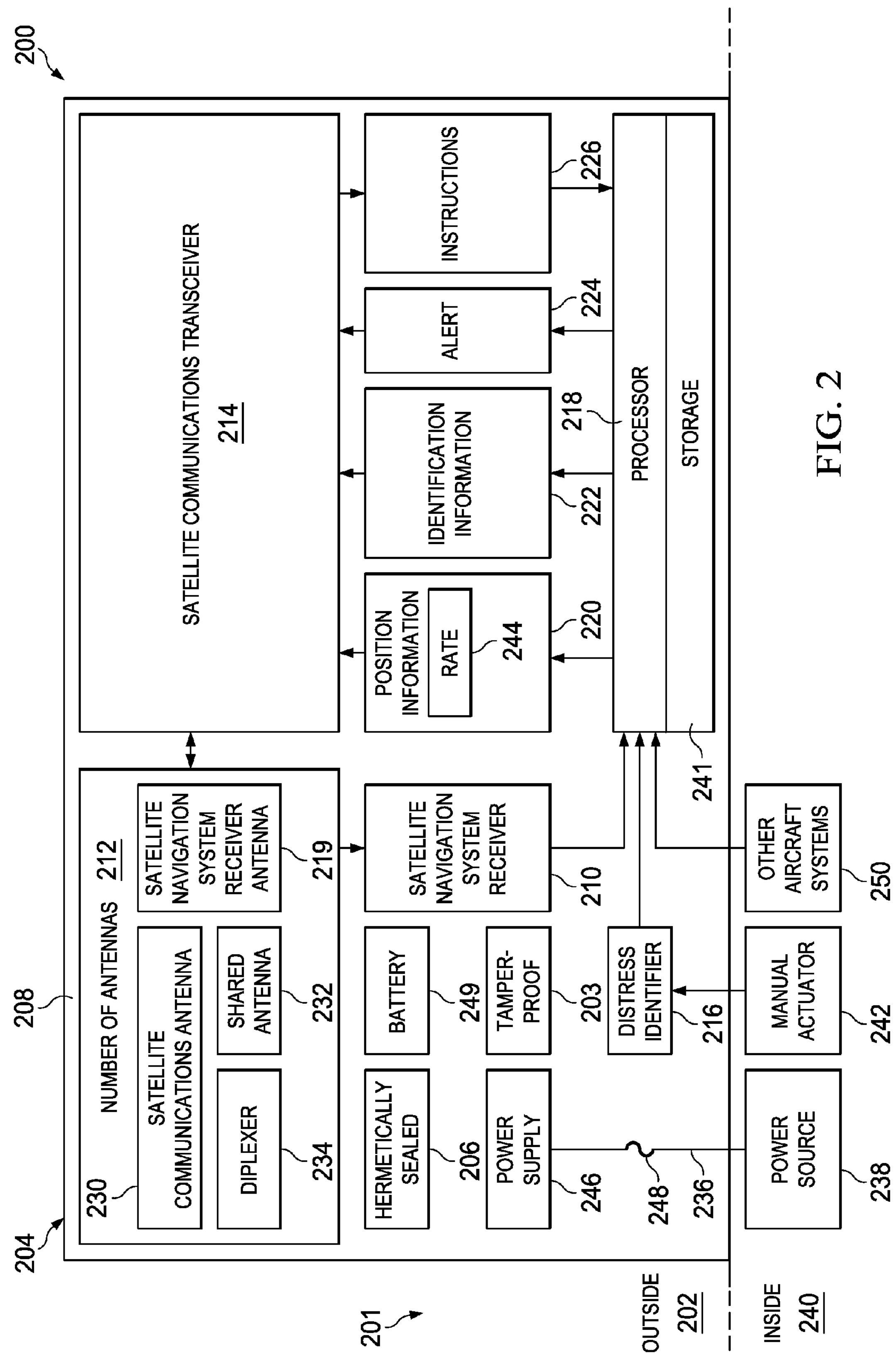
FIG. 2 is an illustration of a block diagram of a tracking device on an aircraft in accordance with an illustrative embodiment.

Turning to FIG. 2, an illustration of a block diagram of a tracking device on an aircraft is depicted in accordance with an illustrative embodiment. Tracking device 200 attached to aircraft 201 may be an example of one implementation of tracking device 104 attached to aircraft 102 in FIG. 1.

For example, without limitation, tracking device 200 may be attached to aircraft 201 on outside 202 of aircraft 201. Attaching tracking device 200 to aircraft 201 on outside 202 of aircraft 201 and other features of tracking device 200 described herein make tracking device 200 tamper-proof 203. Tracking device 200 may be considered tamper-proof 203 when the possibility of undesired tampering with operation of tracking device 200 from inside 240 of aircraft 201 is substantially reduced or eliminated. For example, without limitation, attaching tracking device 200 to aircraft 201 on outside 202 of aircraft 201 and limiting connections to tracking device 200 from inside 240 of aircraft 201 in combination make tracking device 200 tamper-proof 203.

Tracking device 200 comprises various electronics contained within housing 204. Housing 204 may be made in any appropriate manner of any appropriate material such that the electronics contained inside housing 204 are protected to maintain proper operation of tracking device 200 when tracking device 200 is attached to aircraft 201 on outside 202 of aircraft 201. For example, without limitation, the electronics may be hermitically sealed 206 within interior 208 of housing 204. The electronics may be hermetically sealed 206 within interior 208 of housing 204 using any appropriate materials and structures to provide an airtight seal between interior 208 of housing 204 and outside 202 of aircraft 201 when tracking device 200 is attached to aircraft 201 on outside 202 of aircraft 201.

Housing 204 may have any appropriate shape. For example, without limitation, housing 204 may have an appropriately aerodynamic shape. Electronics for tracking device 200 may include satellite navigation system receiver 210, number of antennas 212, satellite communications transceiver 214, distress identifier 216, and processor 218.

Satellite navigation system receiver 210 may be configured to receive navigation signals from satellites in a satellite navigation system via number of antennas 212. For example, without limitation, satellite navigation system receiver 210 may be configured to use satellite navigation system receiver antenna 219 in number of antennas 212 to receive the navigation signals. For example, without limitation, satellite navigation system receiver 210 may be configured to receive navigation signals from satellites in a global navigation satellite system such as the Global Positioning System (GPS), the Global Navigation Satellite System (GLONASS), another appropriate satellite navigations system, or from various combinations of satellite navigation systems. In accordance with an illustrative embodiment, the navigation signals received by satellite navigation system receiver 210 may be used to determine the position of aircraft 201.

Satellite communications transceiver 214 may be configured to send and receive information via a satellite communications system. For example, without limitation, satellite communications transceiver 214 may be configured to send and receive information via communications satellites in low Earth orbit, such as satellites in the Iridium network, other appropriate communications satellites, or various communications satellites from various combinations of satellite communications systems.

In accordance with an illustrative embodiment, satellite communications transceiver 214 may be used to send position information 220 to a receiving station via a satellite. Position information 220 may include information identifying the position determined using the navigation signals received by satellite navigation system receiver 210. In distinct embodiments, position information 220 may be augmented by additional information such as time stamps, and other aircraft navigation or aircraft state data.

Satellite communications transceiver 214 also may be used to send identification information 222, alert 224, other appropriate information, or various combinations of appropriate information to a receiving station via a satellite. Identification information 222 may include information identifying aircraft 201. Alert 224 may include information indicating that aircraft 201 is in distress.

Satellite communications transceiver 214 also may be configured to receive instructions 226 via a satellite. For example, without limitations, instructions 226 may include instructions for controlling operation of the electronics for tracking device 200.

Satellite communications transceiver 214 may use satellite communications antenna 230 in number of antennas 212 to send and receive communications from a communications satellite. Alternatively, satellite communications transceiver 214 and satellite navigation system receiver 210 may share the use of shared antenna 232 in number of antennas 212. In this case, diplexer 234 or another appropriate device may be used for separating and directing the appropriate signals from shared antenna 232 to satellite navigation system receiver 210 and satellite communications transceiver 214 and for directing any signals from satellite communications transceiver 214 to shared antenna 232.

Distress identifier 216 may be configured to identify when aircraft 201 is in distress. The functions performed by distress identifier 216 may be implemented in hardware or in software running on hardware. For example, without limitation, the functions performed by distress identifier 216 may be implemented, in whole or in part, in software running on processor 218. Alternatively, the functions performed by distress identifier 216 may be implemented entirely separately from processor 218.

Distress may include any undesired condition of aircraft 201. Distress identifier 216 may be configured to identify when aircraft 201 is in distress automatically in any appropriate manner. For example, without limitation, distress identifier 216 may determine that aircraft 201 is in distress when power for operation of electronics for tracking device 200 that is provided on power line 236 from power source 238 on inside 240 of aircraft 201 is interrupted.

In some distinct embodiments, a list or a matrix of indicators that aircraft 201 is in distress, or factors associated with aircraft 201 in distress, may be stored in storage 241 and used by distress identifier 216 to automatically determine that aircraft 201 is in distress. Examples of indicators that aircraft 201 is in distress may include abnormal position changes, abnormal deviations from flight plans, and abnormal commanded changes to the configuration of aircraft 201 that may put the aircraft in harm.

Alternatively, or in addition, distress identifier 216 may be configured to identify when aircraft 201 is in distress in response to the operation of manual actuator 242 by a human operator. Manual actuator 242 may comprise any appropriate actuation or signaling device that may be operated manually by a human operator located inside 240 aircraft 201. For example, without limitation, distress identifier 216 may determine that aircraft 201 is in distress in response to manual activation of a switch or other appropriate manual actuator 242 by a human operator inside 240 of aircraft 201. In this case, the switch or other appropriate one of manual actuator 242 may be connected to provide an appropriate signal to indicate distress to distress identifier 216 either by a wire or wirelessly in any appropriate manner.

Preferably, no interface or other capability is provided for a human operator inside 240 of aircraft 201 to inhibit or cancel any such indication of distress that is provided to or determined by distress identifier 216. Limiting interfaces for controlling operation of tracking device 200 from inside 240 of aircraft 201 in this manner may reduce or eliminate accidental or intentional tampering with the desirable operation of tracking device 200.

Distress identifier 216 may provide an appropriate indication to processor 218 in response to automatic or manual identification of distress by distress identifier 216. An indication that aircraft 201 is in distress may be provided from distress identifier 216 to processor 218 in any appropriate manner and form.

Processor 218 may be configured to control the operation of tracking device 200 including satellite navigation system receiver 210 and satellite communications transceiver 214. For example, processor 218 may be configured to use satellite navigation system receiver 210 to determine the position of aircraft 201 and to generate position information 220 identifying the position of aircraft 201 as identified using satellite navigation system receiver 210. Processor 218 may be configured to use satellite communications transceiver 214 to send position information 220 to a receiver station via a satellite. Processor 218 may be configured to generate and send position information 220 automatically at rate 244 while aircraft 201 is in flight.

Rate 244 may be defined by fixed intervals. Alternatively, processor 218 may be configured to change rate 244 for generating and sending position information 220 based on various conditions. For example, processor 218 may be configured to change rate 244 for generating and sending position information 220 based on the geographic location of aircraft 201. For example, without limitation, processor 218 may be configured to send updates for position information 220 more frequently when aircraft 201 is in flight over the ocean or in another remote location. Processor 218 may be configured to send position information updates less frequently when aircraft 201 is in flight in a location where aircraft 201 may be in sight of an air traffic control radar system or in another less remote location. Processor 218 also may be configured to generate and send position information 220 more frequently when it is determined that aircraft 201 is in distress.

Processor 218 also may be configured to generate and send alert 224 when it is determined that aircraft 201 is in distress. For example, alert 224 may be generated and sent by processor 218 to a receiving station via a satellite along with or in addition to position information 220 transmitted using satellite communications transceiver 214. For example, without limitation, alert 224 may include or be associated with position information 220 identifying the position of aircraft 201 when the distress started. For example, without limitation, alert 224 may include information identifying various characteristics of the distress, such as the condition or event that triggered the indication of distress or any other appropriate information or various combinations of information about the distress.

Processor 218 also may be configured to take appropriate action in response to instructions 226 received via a satellite and satellite communications transceiver 214. For example, without limitation, processor 218 may be configured to generate and send position information 220, change rate 244 for generating and sending position information 220, or take other appropriate actions or various combinations of actions in response to instructions 226 received via satellite communications transceiver 214.

Electronics for tracking device 200 may include power supply 246. Power supply 246 may be implemented in any appropriate manner to provide appropriate electrical power for operation of the various electronic components in tracking device 200 from electrical power provided to power supply 246 on power line 236. For example, without limitation, in the case where tracking device 200 is attached to aircraft 201 on outside 202 of aircraft 201, power line 236 may be connected to provide electrical power to power supply 246 from power source 238 on inside 240 of aircraft 201. Power source 238 may comprise any appropriate source of electrical power for operation of tracking device 200.

Power line 236 may be implemented in any appropriate manner to provide electrical power from an appropriate power source 238 to power supply 246 in tracking device 200. Various undesirable conditions on power line 236 may cause inconsistencies in power supply 246 or other electronics in tracking device 200. For example, without limitation, power line 236 may include circuit breaker 248. Circuit breaker 248 may be implemented in any known and appropriate manner to prevent undesirable conditions on power line 236 from reaching power supply 246 or other electronics in tracking device 200. For example, without limitation, circuit breaker 248 may be implemented in a known and appropriate manner to prevent excessive current, excessive voltage, excessive power, or any other undesirable condition or combination of undesirable conditions on power line 236 from reaching power supply 246 and other electronics for tracking device 200.

Electrical power for operation of tracking device 200 may include battery 249. Battery 249 may be contained in housing 204 along with the other electronic components of tracking device 200. Battery 249 may include any appropriate type and number of batteries for providing appropriate electrical power for operation of various electronic components in tracking device 200. Power for operation of tracking device 200 may be provided by battery 249 as an alternative or in addition to providing power for operation of tracking device 200 from power source 238 via power line 236. For example, without limitation, when power for operation of tracking device 200 is available from both battery 249 and from power source 238 via power line 236, battery 249 may be used to provide back-up power for operation of tracking device 200 when power on power line 236 is interrupted. For example, without limitation, when tracking device 300 is attached to aircraft 201 on outside 202 of aircraft 201, providing battery 249 for powering tracking device 200 may prevent accidental or intentional disabling of the operation of tracking device 200 from inside 240 of aircraft 201 by disrupting power for tracking device 200 that is provided on power line 236 from power source 238 located inside 240 of aircraft 201.

The different components illustrated for tracking device 200 are not meant to provide architectural limitations to the manner in which different embodiments may be implemented. The different illustrative embodiments may be implemented in a system including components in addition to or in place of those illustrated for tracking device 200. Other components shown in FIG. 2 can be varied from the illustrative examples shown.

For example, without limitation, processor 218 may also be configured to receive information identifying the position of aircraft 201 from other aircraft systems 250 on inside 240 of aircraft 201. Information provided by other aircraft systems 250 may be used for back-up, calibration, testing, or in comparison with the position of aircraft 201 identified using satellite navigation system receiver 210.

Electronics for tracking device 200 may be implemented in any appropriate manner using any appropriate hardware or hardware in combination with software. For example, without limitation, processor 218 may be configured to execute instructions for software that may be loaded or otherwise stored in storage 241. Processor 218 may be a number of processors, a multi-processor core, or some other type of processor, depending on the particular implementation. Further, processor 218 may be implemented using a number of heterogeneous processor systems in which a main processor is present with secondary processors on a single chip. As another illustrative example, processor 218 may be a symmetric multi-processor system containing multiple processors of the same type.

Storage 241 may include memory, persistent storage, or any other appropriate storage devices or various combinations of storage devices. Storage 241 may comprise any piece of hardware that is capable of storing information, such as, for example, without limitation, data, program code in functional form, and/or other suitable information either on a temporary basis and/or a permanent basis. Storage 241 may also be referred to as a computer readable storage device in these examples. Storage 241, in these examples, may be, for example, a random access memory or any other suitable volatile or non-volatile storage device. Storage 241 may take various forms, depending on the particular implementation. For example, storage 241 may be implemented, in whole or in part, as part of processor 218. Alternatively, storage 241 may be implemented entirely separately from processor 218.

In any case, instructions for the operating system, applications, and/or programs may be located in storage 241, which is in communication with processor 218 in any appropriate manner. The processes of the different embodiments may be performed by processor 218 using computer-implemented instructions, which may be located in storage 241. These instructions may be referred to as program instructions, program code, computer usable program code, or computer readable program code that may be read and executed by processor 218. The program code in the different embodiments may be embodied on different physical or computer readable storage media.

In these examples, storage 241 may be a physical or tangible storage device used to store program code rather than a medium that propagates or transmits program code. In this case, storage 241 may be referred to as a computer readable tangible storage device or a computer readable physical storage device. In other words, storage 241 is embodied in a medium that can be touched by a person.

Alternatively, program code may be transferred to processor 218 using computer readable signal media. Computer readable signal media may be, for example, a propagated data signal containing program code. For example, computer readable signal media may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples. In some illustrative embodiments, program code may be downloaded over a network to storage 241 from another device or data processing system through computer readable signal media for use within processor 218.

The different embodiments may be implemented using any hardware device or system capable of running program code. As one example, electronics for tracking device 200 may include organic components integrated with inorganic components and/or may be comprised entirely of organic components excluding a human being. For example, storage 241 may be comprised of an organic semiconductor.

In another illustrative example, processor 218 may take the form of a hardware unit that has circuits that are manufactured or configured for a particular use. This type of hardware may perform operations without needing program code to be loaded in storage 241 to be configured to perform the operations.

For example, when processor 218 takes the form of a hardware unit, processor 218 may be a circuit system, an application-specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code may be omitted, because the processes for the different embodiments are implemented in a hardware unit.

In still another illustrative example, processor 218 may be implemented using a combination of processors found in computers and hardware units. Processor 218 may have a number of hardware units and a number of processors that are configured to run program code. With this depicted example, some of the processes may be implemented in the number of hardware units, while other processes may be implemented in the number of processors.

Figure 3:
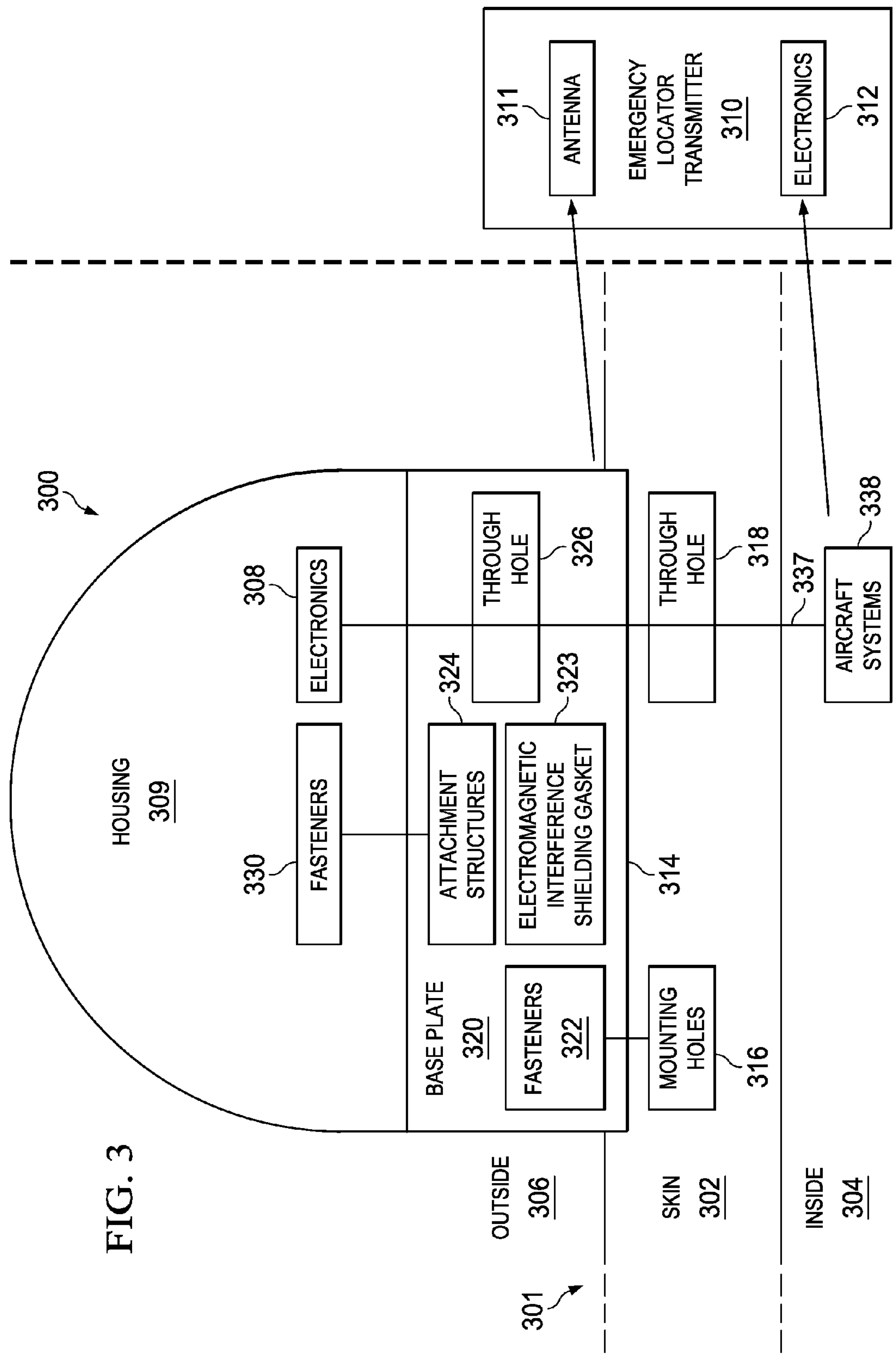
FIG. 3 is an illustration of a block diagram of a tracking device attached to an aircraft to replace an emergency locator transmitter on the aircraft in accordance with an illustrative embodiment.

Turning to FIG. 3, an illustration of a block diagram of a tracking device attached to an aircraft to replace an emergency locator transmitter on the aircraft is depicted in accordance with an illustrative embodiment. Tracking device 300 on aircraft 301 may be an example of one implementation of tracking device 104 on aircraft 102 in FIG. 1 or of tracking device 200 on aircraft 201 in FIG. 2.

Tracking device 300 is attached to skin 302 of aircraft 301 on outside 306 of aircraft 301. Skin 302 comprises any appropriate structure that separates outside 306 of aircraft 301 from inside 304 of aircraft 301.

Tracking device 300 comprises electronics 308 contained within housing 309. Electronics 308 may be configured to automatically determine a position of aircraft 301 to which tracking device 300 is attached and to send position information identifying the position of aircraft 301 to a receiving station via a satellite. For example, electronics 308 may be configured to identify the position of aircraft 301 using navigation signals received from a number of satellites in a satellite navigation system. For example, without limitation, electronics 308 may be configured to send position information identifying the position of aircraft 301 to a receiving station via an Iridium communications satellite or another appropriate communications satellite in low Earth orbit. Electronics 308 also may be configured to send an alert to the receiving station via a communications satellite when aircraft 301 is determined to be in distress, to receive instructions or other information for controlling the operation of tracking device 300 via a communications satellite, or to perform other appropriate functions or various combinations of appropriate functions.

The functionality provided by tracking device 300 may replace and improve upon the functionality provided by emergency locator transmitter 310 on aircraft 301. For example, without limitation, emergency locator transmitter 310 may be removed from aircraft 301 before tracking device 300 is attached to aircraft 301. Removing emergency locator transmitter 310 from aircraft 301 may include removing antenna 311 for emergency locator transmitter 310 from skin 302 of aircraft 301 on outside 306 of aircraft 301 and removing electronics 312 for emergency locator transmitter 310 from inside 304 of aircraft 301.

Footprint 314 of antenna 311 is the area on skin 302 of aircraft 301 from which antenna 311 for emergency locator transmitter 310 was removed. Footprint 314 may include various structures for positioning antenna 311 for emergency locator transmitter 310 on skin 302 of aircraft 301, for attaching antenna 311 for emergency locator transmitter 310 to skin 302 of aircraft 301, for sealing antenna 311 to skin 302 of aircraft 301, or for other appropriate purposes or various combinations of purposes. For example, without limitation, footprint 314 may include mounting holes 316 and through hole 318. Mounting holes 316 may include any appropriate number of holes in skin 302 of aircraft 301 within footprint 314. Mounting holes 316 may have been used to attach antenna 311 for emergency locator transmitter 310 to skin 302 of aircraft 301. Through hole 318 may comprise a hole extending from inside 304 of aircraft 301 to outside 306 of aircraft 301 through skin 302 of aircraft 301 within footprint 314. Through hole 318 may have been used for extending wiring through skin 302 of aircraft 301 to connect antenna 311 for emergency locator transmitter 310 to electronics 312 for emergency locator transmitter 310.

Tracking device 300 may be attached to skin 302 of aircraft 301 in footprint 314, at the location on skin 302 of aircraft 301 from where antenna 311 for emergency locator transmitter 310 was removed. For example, base plate 320 may be attached to skin 302 of aircraft 301 in footprint 314. The area covered by base plate 320 on skin 302 of aircraft 301 may match footprint 314. In other words, the footprint of base plate 320 may match footprint 314 of antenna 311 for emergency locator transmitter 310 removed from aircraft 301.

Base plate 320 may be attached to skin 302 of aircraft 301 using appropriate fasteners 322. For example, without limitation, fasteners 322 may extend from base plate 320 into mounting holes 316 in skin 302 of aircraft 301 to attach base plate 320 to skin 302 of aircraft 301. Fasteners 322 may include any appropriate structures for attaching base plate 320 to skin 302 of aircraft 301. For example, without limitation, fasteners 322 may include screws, bolts, clips, rivets, an adhesive, any other appropriate fastening structure or material, or various combinations of appropriate fasteners.

Base plate 320 may be made of any appropriate material in any appropriate manner. For example, without limitation, base plate 320 may comprise an appropriate electromagnetic interference shielding material. In this case, base plate 320 may be configured to perform the function of electromagnetic interference shielding gasket 323. Alternatively, or in addition, electromagnetic interference shielding gasket 323 that is not part of base plate 320 may be used. For example, without limitation, electromagnetic interference shielding gasket 323 may be positioned between base plate 320 and skin 302 of aircraft 301, between base plate 320 and housing 309, or both. Electromagnetic interference shielding gasket 323 may be configured to reduce or prevent undesired electromagnetic interference with operation of tracking device 300 from a source of electromagnetic interference inside 304 of aircraft 301 and vice versa. For example, without limitation, electromagnetic interference shielding gasket 323 may be configured to reduce or prevent undesired radio frequency interference with operation of tracking device 300 from a source of radio frequency interference inside 304 of aircraft 301 and vice versa.

For example, without limitation, base plate 320 may include attachment structures 324 and through hole 326. Base plate 320 may be positioned on skin 302 of aircraft 301 such that through hole 326 in base plate 320 may be aligned with through hole 318 in skin 302 of aircraft 301 when base plate 320 is attached to skin 302 of aircraft 301.

Housing 309 may be attached to base plate 320 using appropriate fasteners 330. For example, without limitation, fasteners 330 may extend from housing 309 to engage attachment structures 324 on base plate 320 to attach housing 309 to base plate 320. Fasteners 330 may include any appropriate structures for attaching housing 309 to base plate 320. Appropriate fasteners 330 to be used for any particular implementation may depend on the particular implementation of corresponding attachment structures 324 in base plate 320, and vice versa. For example, without limitation, fasteners 330 may include screws, bolts, clips, rivets, an adhesive, any other appropriate fastening structure or material, or various combinations of appropriate fasteners. Fasteners 330 for attaching housing 309 to base plate 320 may be the same as or different from fasteners 322 for attaching base plate 320 to skin 302 of aircraft 301.

Line 337 may be extended from electronics 308 in housing 309 attached to skin 302 of aircraft 301 on outside 306 of aircraft 301 to aircraft systems 338 inside 304 of aircraft 301. For example, line 337 may be extended through hole 326 in base plate 320 and through hole 318 in skin 302 of aircraft 301 to connect aircraft systems 338 to electronics 308. In various distinct embodiments, line 337 may include one or more wires, data buses, or other appropriate connections between electronics 308 in tracking device 300 and aircraft systems 338. For example, without limitation, line 337 may comprise a power line extending from electronics 308 in housing 309 of tracking device 300 to aircraft systems 338 providing a source of electrical power for tracking device 300. Alternatively, or in addition, without limitation, line 337 may include a wire or other physical structure for carrying appropriate signals to electronics 308 in tracking device 300 from aircraft systems 338 inside 304 of aircraft 301 to indicate that aircraft 301 is in distress, to provide information identifying the position of aircraft 301, or for any other appropriate purpose or various combinations of purposes.

The illustration of FIG. 3 is not meant to imply physical or architectural limitations to the manner in which different illustrative embodiments may be implemented. Other components in addition to, in place of, or in addition to and in place of the ones illustrated may be used. Some components may be unnecessary in some illustrative embodiments. Also, the blocks are presented to illustrate some functional components. One or more of these blocks may be combined, divided, or combined and divided into different blocks when implemented in different illustrative embodiments.

For example, tracking device 300 may be attached to skin 302 of aircraft 301 without using base plate 320. For example, without limitation, tracking device 300 may be attached to skin 302 of aircraft 301 by attaching housing 309 directly to skin 302 of aircraft 301 on outside 306 of aircraft 301 in an appropriate manner. Alternatively, tracking device 300 may be attached to skin 302 of aircraft 301 by attaching housing 309 to skin 302 of aircraft 301 on outside 306 of aircraft 301 with only electromagnetic interference shielding gasket 323 between housing 309 and skin 302 of aircraft 301. The area covered by housing 309 or electromagnetic interference shielding gasket 323 on skin 302 of aircraft 301 when housing 309 is attached to skin 302 of aircraft 301 may match footprint 314 of antenna 311 for emergency locator transmitter 310 removed from aircraft 301. In other words, the footprint of housing 309 or electromagnetic interference shielding gasket 323 may match footprint 314 of antenna 311 for emergency locator transmitter 310 removed from aircraft 301.

Figure 4:
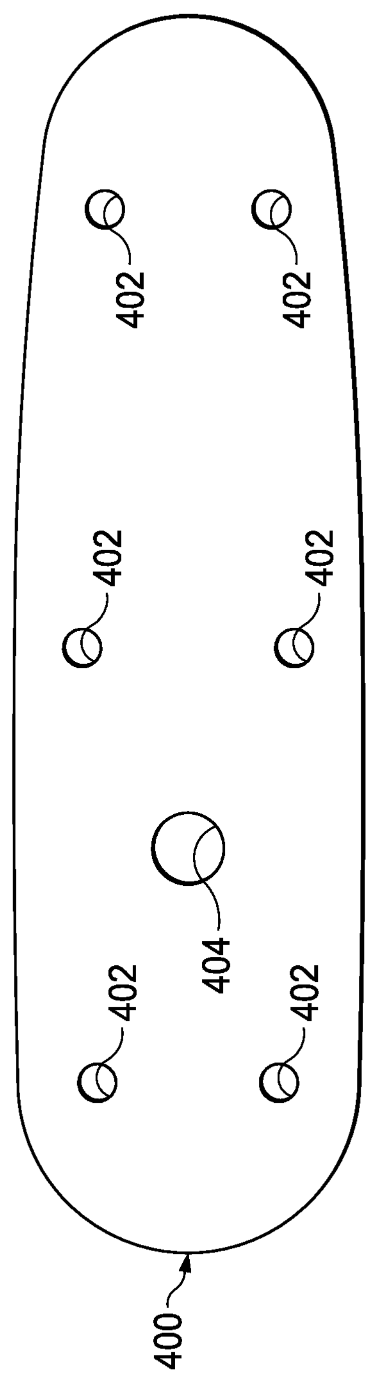
FIG. 4 is an illustration of a footprint of an antenna for an emergency locator transmitter on the skin of an aircraft in accordance with an illustrative embodiment.

Turning to FIG. 4, an illustration of a footprint of an antenna for an emergency locator transmitter on the skin of an aircraft is depicted in accordance with an illustrative embodiment. Footprint 400 may be an example of one implementation of footprint 314 of antenna 311 for emergency locator transmitter 310 on the skin of aircraft 301 in FIG. 3.

Footprint 400 may be the area on the outside surface of the skin of an aircraft which is or was covered by the structure of an antenna for an emergency locator transmitter when the antenna is or was attached to the skin of the aircraft. In accordance with an illustrative embodiment, a tracking device comprising electronics configured to automatically determine the position of the aircraft and to automatically send position information identifying the position of the aircraft to a receiving station via a satellite may be attached to the skin of the aircraft in footprint 400 after removing the antenna for the emergency locator transmitter from the skin of the aircraft.

Footprint 400 may include various structures for attaching the antenna for an emergency locator transmitter to the skin of the aircraft, for positioning the antenna for the emergency locator transmitter on the skin of the aircraft properly, for sealing the antenna to the skin of the aircraft, for other appropriate purposes, or for various combinations of purposes. A number of these structures may be used when a tracking device in accordance with an illustrative embodiment is attached to the skin of the aircraft in footprint 400 in place of the antenna for the emergency locator transmitter. For example, without limitation, footprint 400 may include mounting holes 402 and through hole 404.

Mounting holes 402 may include any appropriate number of holes in the skin of the aircraft within footprint 400. For example, footprint 400 may include more or fewer than six mounting holes 402. Mounting holes 402 may be located at any appropriate positions within footprint 400. Mounting holes 402 may be configured to receive any appropriate fasteners for attaching the antenna for an emergency locator transmitter to the skin of the aircraft in footprint 400. In accordance with an illustrative embodiment, mounting holes 402 may be used in combination with appropriate fasteners to attach a housing containing the electronics for a tracking device in accordance with an illustrative embodiment to the skin of the aircraft in footprint 400.

Through hole 404 may comprise a hole extending through the skin of the aircraft within footprint 400. For example, footprint 400 may include more or fewer than one through hole 404. Through hole 404 may be located at any appropriate position within footprint 400. An antenna wire may be extended from electronics for an emergency locator transmitter located within the interior of an aircraft to the antenna for the emergency locator transmitter attached to the skin of the aircraft on the outside of the aircraft in footprint 400. In accordance with an illustrative embodiment, a power line for providing power from a power source inside of the aircraft to electronics in a tracking device attached to the skin of the aircraft on the outside of the aircraft in footprint 400 may be extended through hole 404.

Alternatively, through hole 404 may not be used when a tracking device in accordance with an illustrative embodiment is attached to the skin of the aircraft in footprint 400. For example, without limitation, through hole 404 may not be needed when all power for operation of a tracking device attached to the skin of the aircraft in footprint 400 is provided by a battery or other appropriate power source that is contained, along with other electronics for the tracking device, within a housing for the tracking device that is attached to the skin of the aircraft on the outside of the aircraft in footprint 400. Through hole 404 may or may not be filled or covered as appropriate when through hole 404 is not needed for a tracking device attached to the skin of the aircraft in footprint 400.

Figure 5:
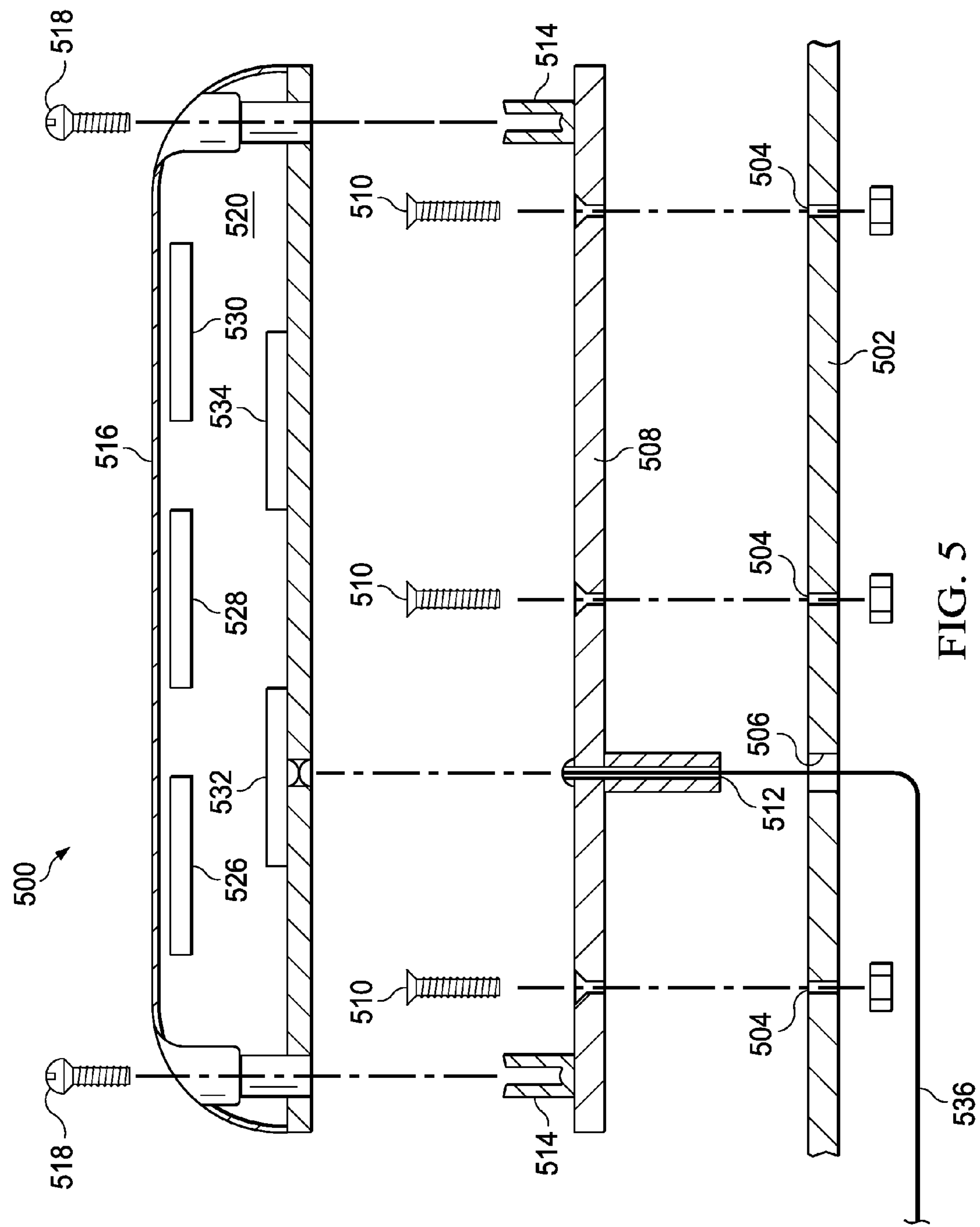
FIG. 5 is an illustration of attaching a tracking device to an aircraft in accordance with an illustrative embodiment.

Turning to FIG. 5, an illustration of attaching a tracking device to an aircraft is depicted in accordance with an illustrative embodiment. Attaching tracking device 500 to skin 502 of an aircraft may be an example of one implementation of attaching tracking device 300 to skin 302 of aircraft 301 in FIG. 3.

Skin 502 includes mounting holes 504 and through hole 506. Base plate 508 is attached to skin 502 using appropriate fasteners 510 that extend through base plate 508 into mounting holes 504. Through hole 512 on base plate 508 is aligned with through hole 506 in skin 502. Attachment structures 514 also are provided on base plate 508.

Housing 516 is attached to base plate 508 by fasteners 518 connected to attachment structures 514 on base plate 508. Interior 520 of housing 516 may be hermetically sealed and may contain, for example, without limitation, Global Positioning System patch antenna 526, Global Navigation Satellite System patch antenna 528, Iridium patch antenna 530, power supply 532, and other electronics 534. Power line 536 may extend from a power source inside of the aircraft to power supply 532 in housing 516 via through hole 506 in skin 502 and through hole 512 in base plate 508.

Figure 6:
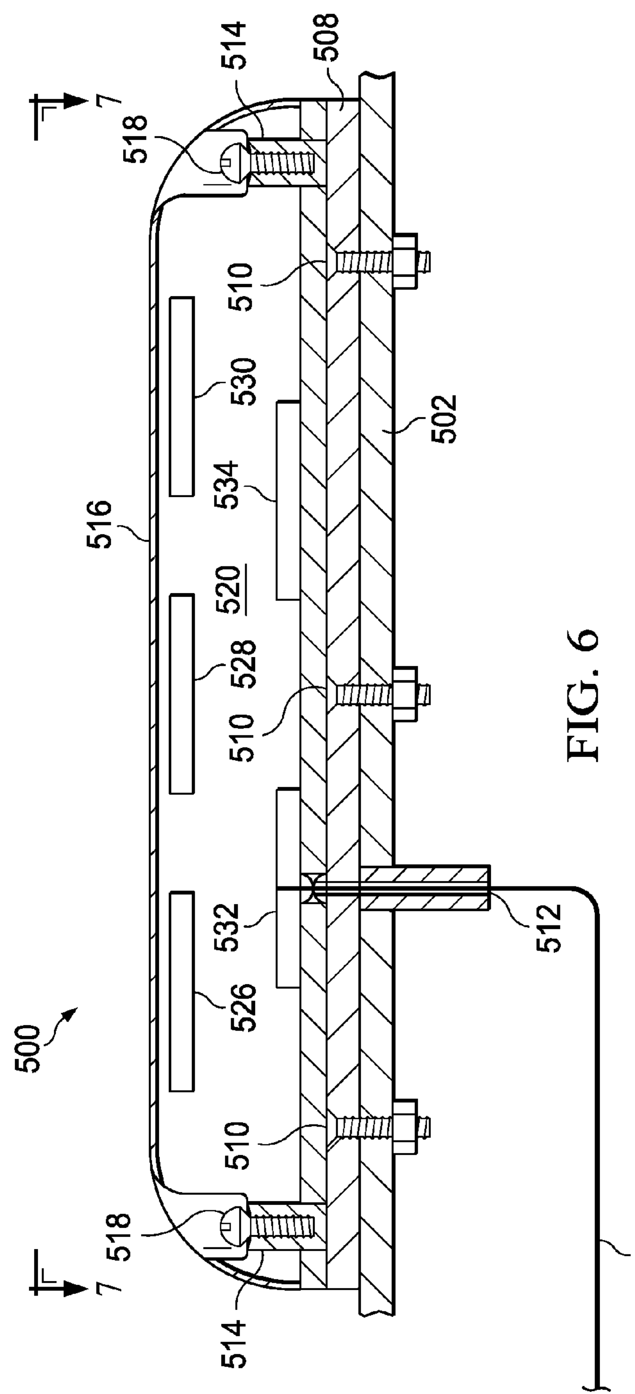
FIG. 6 is an illustration of a tracking device attached to an aircraft in accordance with an illustrative embodiment.

Turning to FIG. 6, an illustration of a tracking device attached to an aircraft is depicted in accordance with an illustrative embodiment. FIG. 6 shows tracking device 500 in FIG. 5 after being attached to skin 502.

Figure 7:
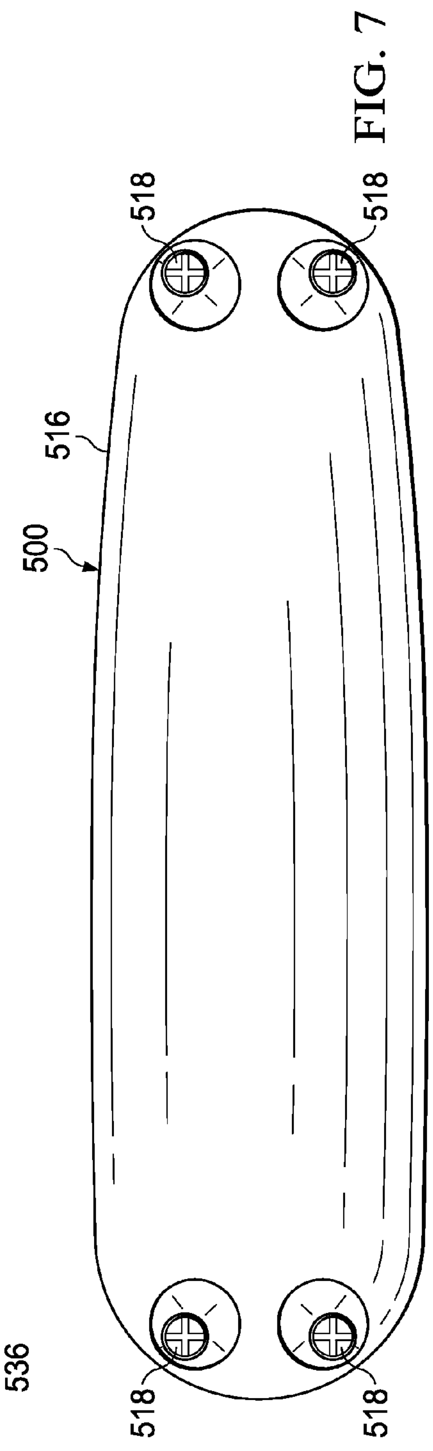
FIG. 7 is an illustration of a top view of the housing for a tracking device in accordance with an illustrative embodiment.

Turning to FIG. 7, an illustration of a top view of the housing for a tracking device is depicted in accordance with an illustrative embodiment. FIG. 7 shows a top view of housing 516 for tracking device 500 taken along lines 7-7 in FIG. 6.

Figure 8:
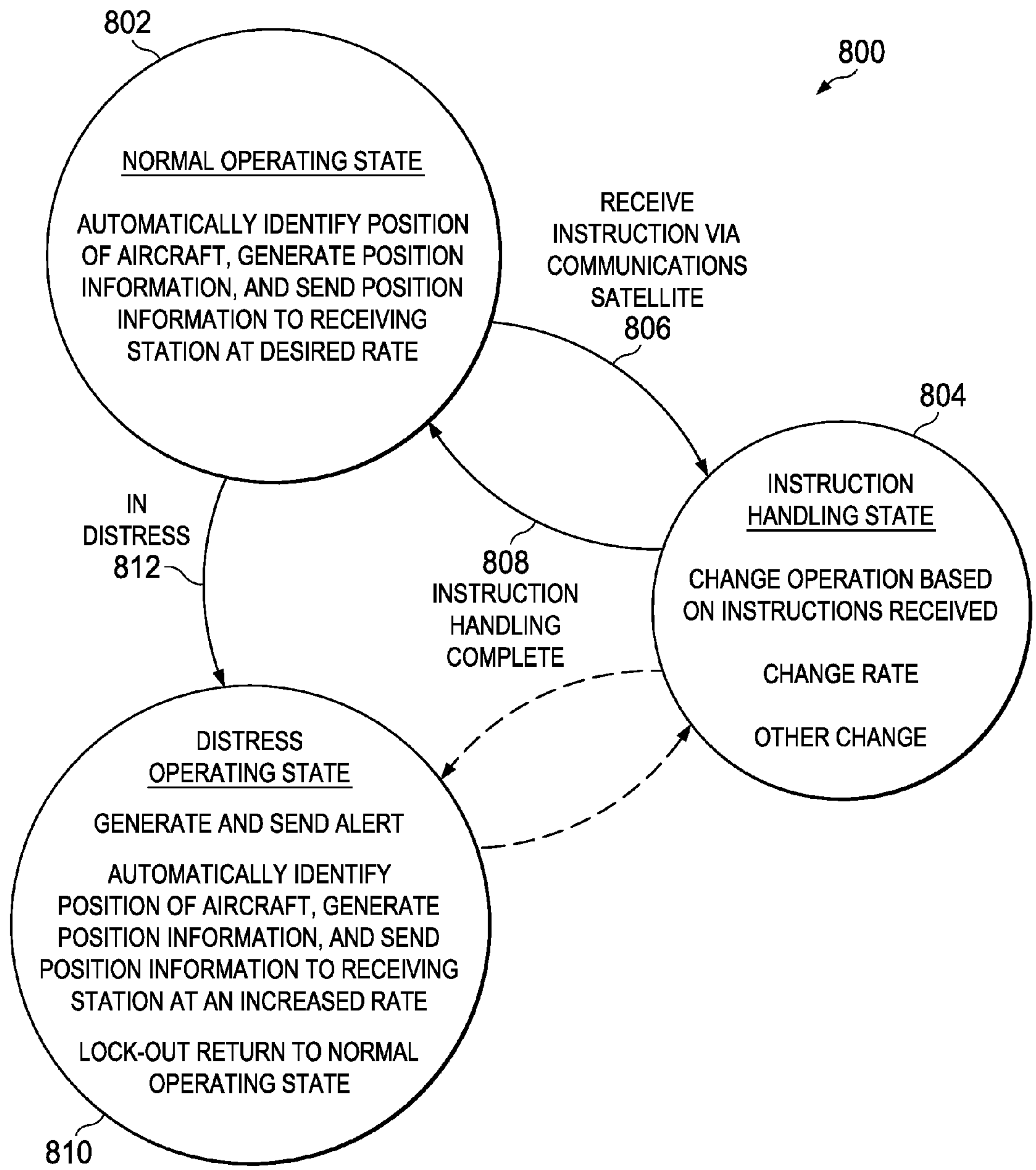
FIG. 8 is an illustration of a state diagram for a tracking device in accordance with an illustrative embodiment.

Turning to FIG. 8, an illustration of a state diagram for a tracking device is depicted in accordance with an illustrative embodiment. Operating states 800 may be examples of states of operation for tracking device 104 on aircraft 102 in FIG. 1, tracking device 200 on aircraft 201 in FIG. 2, or tracking device 300 on aircraft 301 in FIG. 3.

A tracking device operating in normal operating state 802 may automatically identify the position of the aircraft to which it is attached, generate position information identifying the position of the aircraft, and send the position information to a receiving station at a desired rate. The tracking device may transition from normal operating state 802 to instruction handling state 804 in response to receiving instructions via a communications satellite 806.

In instruction handling state 804, the operation of the tracking device may be changed based on the instructions received. For example, without limitation, the rate at which position information is generated and sent by the tracking device to the receiving station may be changed, or another appropriate change to the operation of the tracking device may be made.

Operation of the tracking device may transition back to normal operating state 802 from instruction handling state 804 when the instruction handling is complete 808. For example, without limitation, the instruction handling may be complete when all changes to the operation of the tracking device based on the instructions received have been made.

Operation of the tracking device may transition from normal operating state 802 to distress operating state 810 in response to identifying that the aircraft to which the tracking device is attached is in distress 812. In distress operating state 810, the tracking device may generate and send a distress alert to the receiving station. The tracking device then may automatically identify the position of the aircraft, generate position information, and send the position information to the receiving station at an increased rate.

Return to normal operating state 802 from distress operating state 810 may be prevented. In particular, transition from distress operating state 810 to normal operating state 802 in response to any action by any person on the aircraft to which the tracking device is attached may be prevented. Transition from distress operating state 810 to instruction handling state 804 in response to receiving instructions from off of the aircraft via a communications satellite also may be prevented.

Figure 9:
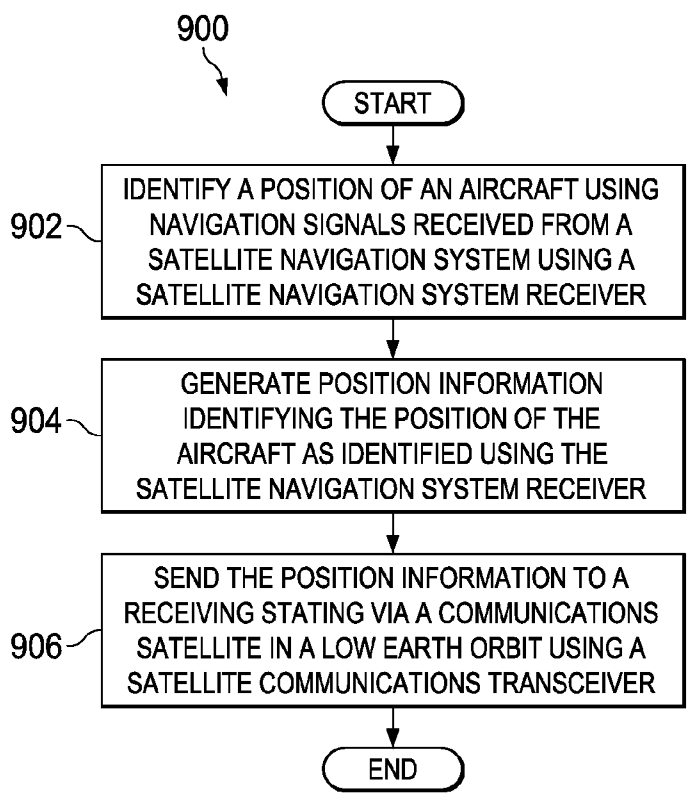
FIG. 9 is an illustration of a flowchart of a process for tracking an aircraft in accordance with an illustrative embodiment.

Turning to FIG. 9, an illustration of a flowchart of a process for tracking an aircraft is depicted in accordance with an illustrative embodiment. Process 900 may be implemented, for example, by tracking device 104 on aircraft 102 in FIG. 1, tracking device 200 on aircraft 201 in FIG. 2, or tracking device 300 on aircraft 301 in FIG. 3.

Process 900 may begin with identifying a position of an aircraft using navigational signals received from a satellite navigation system using a satellite navigation system receiver (operation 902). Position information identifying the position of the aircraft as identified using the satellite navigation system receiver then may be generated (operation 904). The position information then may be sent to a receiving station via a communications satellite in low Earth orbit using a satellite communications transceiver (operation 906), with the process terminating thereafter. Process 900 may be repeated at a desired rate while the aircraft is in flight.

Figure 10:
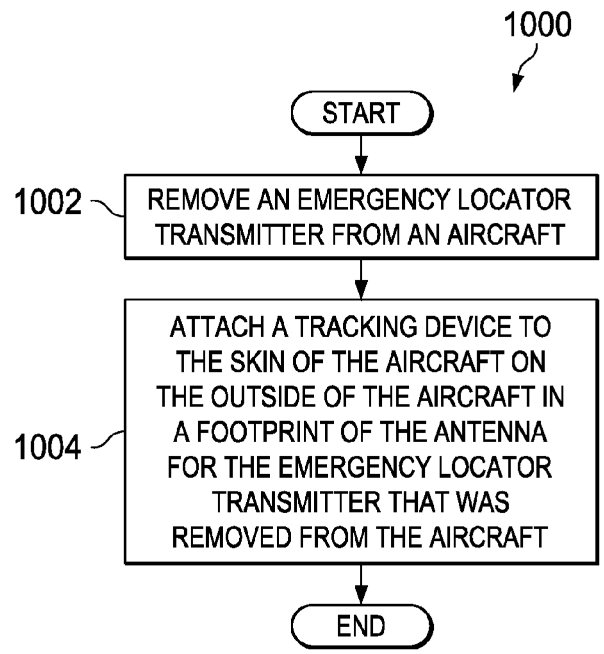
FIG. 10 is an illustration of a flowchart of a process for attaching a tracking device to an aircraft in accordance with an illustrative embodiment.

Turning to FIG. 10, an illustration of a flowchart of a process for attaching a tracking device to an aircraft is depicted in accordance with an illustrative embodiment. Process 1000 may be an example of one implementation of a process for attaching tracking device 300 to aircraft 301 in FIG. 3.

Process 1000 may begin by removing an emergency locator transmitter from an aircraft (operation 1002). Operation 1002 may include removing an antenna for the emergency locator transmitter from where the antenna was attached to a skin of the aircraft on an outside of the aircraft.

A tracking device then may be attached to the skin of the aircraft on the outside of the aircraft in the footprint of the antenna for the emergency locator transmitter that was removed from the aircraft (operation 1004), with the process terminating thereafter. Operation 1004 may include attaching a base plate to the skin of the aircraft and then attaching a housing for the tracking device to the base plate. Alternatively, operation 1004 may include attaching the housing for the tracking device directly to the skin of the aircraft without a base plate. As another example, operation 1004 may include attaching an electromagnetic interference shielding gasket between the housing and the skin of the aircraft.

The description of the different illustrative embodiments has been presented for purposes of illustration and description and is not intended to be exhaustive or to limit the embodiments in the form disclosed. Many modifications and variations will be apparent to those of ordinary skill in the art. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a satellite navigation system receiver configured to identify a position of an aircraft using navigation signals received from a satellite navigation system;
a satellite communications transceiver;
a number of antennas for the satellite navigation system receiver and the satellite communications transceiver;
a processor configured to generate position information identifying the position of the aircraft as identified by the satellite navigation system receiver and send the position information to a receiving station via a communications satellite in a low Earth orbit using the satellite communications transceiver, wherein the processor is configured to generate and send the position information automatically at a rate; and
a housing attached to the aircraft on an outside of the aircraft, wherein the satellite navigation system receiver, the satellite communications transceiver, the number of antennas, and the processor are hermetically sealed within the housing.

2. The apparatus of claim 1, wherein a footprint of the apparatus on the outside of the aircraft matches a footprint on the outside of the aircraft of an antenna for an emergency locator transmitter that was removed from the aircraft.

3. The apparatus of claim 1, wherein:
an only electrical connection between an interior of the housing attached to the aircraft on the outside of the aircraft and an inside of the aircraft consists of a power line connecting the interior of the housing to a power source on the inside of the aircraft; and
further comprising a battery contained within the housing and configured to provide backup power for the apparatus when power for the apparatus from the power source on the inside of the aircraft is lost.

4. The apparatus of claim 1, wherein the number of antennas comprise:
a satellite navigation system receiver antenna for the satellite navigation system receiver and a satellite communications antenna for the satellite communications transceiver.

5. The apparatus of claim 1, wherein:
the satellite navigation system receiver is configured to receive the navigation signals from satellites in the satellite navigation system selected from the group of satellite navigation systems consisting of a Global Positioning System and a Global Navigation Satellite System; and
the satellite communications transceiver is configured to send the position information to the receiving station via an Iridium communications satellite.

6. The apparatus of claim 1, wherein the processor is further configured to:
receive instructions via the satellite communications transceiver; and
change the rate at which the position information is generated and sent to the receiving station in response to receiving the instructions.

7. The apparatus of claim 1 further comprising:
a distress identifier configured to identify when the aircraft is in distress; and
wherein the processor is configured to increase the rate at which the position information is generated and sent to the receiving station in response to the distress identifier identifying that the aircraft is in distress.

8. The apparatus of claim 1 further comprising:
a distress identifier configured to identify when the aircraft is in distress; and
wherein the processor is configured to generate and send an alert indicating that the aircraft is in distress to the receiving station via the communications satellite using the satellite communications transceiver in response to the distress identifier identifying that the aircraft is in distress.

9. A method of tracking a position of an aircraft, comprising:
identifying, using a satellite navigation system receiver, the position of the aircraft using navigation signals received from a satellite navigation system;
generating, by a processor, position information identifying the position of the aircraft as identified using the satellite navigation system receiver;
sending, by the processor, the position information to a receiving station via a communications satellite in a low Earth orbit using a satellite communications transceiver;
wherein the processor generates and sends the position information automatically at a rate; and
wherein the satellite navigation system receiver, the processor, and the satellite communications transceiver are hermetically sealed within a housing attached to the aircraft on an outside of the aircraft.

10. The method of claim 9, wherein:
an only electrical connection between an interior of the housing attached to the aircraft on the outside of the aircraft and an inside of the aircraft consists of a power line connected to a power source on the inside of the aircraft; and
further comprising providing backup power from a battery contained within the housing when power from the power source on the inside of the aircraft is lost.

11. The method of claim 9 further comprising:
a satellite navigation system receiver antenna for the satellite navigation system receiver and a satellite communications antenna for the satellite communications transceiver contained within the housing.

12. The method of claim 9, wherein:
the navigation signals are received from the satellite navigation system selected from the group of satellite navigation systems consisting of a Global Positioning System and a Global Navigation Satellite System; and
the position information is sent to the receiving station via an Iridium communications satellite.

13. The method of claim 9 further comprising:
receiving instructions, by the processor, via the satellite communications transceiver; and
changing the rate at which the position information is generated and sent to the receiving station in response to receiving the instructions by the processor.

14. The method of claim 9 further comprising:
identifying when the aircraft is in distress; and
increasing the rate at which the position information is generated and sent to the receiving station in response to identifying that the aircraft is in distress.

15. The method of claim 9 further comprising:
identifying when the aircraft is in distress; and
generating an alert indicating that the aircraft is in distress and sending the alert to the receiving station via the communications satellite using the satellite communications transceiver in response to identifying that the aircraft is in distress.

16. A method of attaching a tamper-proof tracking device to an aircraft, comprising:

removing an antenna for an emergency locator transmitter from a location on a skin of the aircraft where the antenna for the emergency locator transmitter is attached to the skin of the aircraft; and attaching the tamper-proof tracking device to the skin of the aircraft at the location on the skin of the aircraft where the antenna for the emergency locator transmitter was attached to the skin of the aircraft, wherein the tamper-proof tracking device comprises:

a satellite navigation system receiver configured to identify a position of the aircraft using navigation signals received from a satellite navigation system;

a satellite communications transceiver;

a number of antennas for the satellite navigation system receiver and the satellite communications transceiver;

a processor configured to generate position information identifying the position of the aircraft as identified by the satellite navigation system receiver and send the position information to a receiving station via a communications satellite in a low Earth orbit using the satellite communications transceiver; and a housing containing the satellite navigation system receiver, the satellite communications transceiver, the number of antennas, and the processor, wherein the satellite navigation system receiver, the satellite communications transceiver, the number of antennas, and the processor are hermetically sealed within the housing.

17. The method of claim 16, wherein attaching the tamper-proof tracking device to the skin of the aircraft comprises:

attaching the tamper-proof tracking device to the skin of the aircraft such that a footprint of the tamper-proof tracking device on the skin of the aircraft matches a footprint of the antenna for the emergency locator transmitter on the skin of the aircraft.

18. The method of claim 16, wherein attaching the tamper-proof tracking device to the skin of the aircraft comprises:

attaching a base plate to the skin of the aircraft in a footprint on the skin of the aircraft where the antenna for the emergency locator transmitter was attached to the skin of the aircraft; and attaching the housing to the base plate.

19. The method of claim 16, wherein attaching the tamper-proof tracking device to the skin of the aircraft comprises:

attaching an electromagnetic interference shielding gasket between the tamper-proof tracking device and the skin of the aircraft.

20. The method of claim 16 further comprising:

extending a power line from the tamper-proof tracking device to a power source on an inside of the aircraft via a through hole in the skin of the aircraft, wherein the power line comprises an only electrical connection between the tamper-proof tracking device attached to the skin of the aircraft and the inside of the aircraft.

* * * * *